United States Patent
Oki et al.

(10) Patent No.: US 6,735,206 B1
(45) Date of Patent: *May 11, 2004

(54) METHOD AND APPARATUS FOR PERFORMING A FAST SERVICE LOOKUP IN CLUSTER NETWORKING

(75) Inventors: Brian M. Oki, San Jose, CA (US); Sohrab Modi, Oakland, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/480,146

(22) Filed: Jan. 10, 2000

(51) Int. Cl.[7] .......................... H04L 12/28; H04L 12/56
(52) U.S. Cl. .................. 370/395.32; 370/401; 370/409; 370/392; 370/400.32; 370/428; 709/105; 709/226; 709/240; 709/227; 709/245; 709/246; 709/249
(58) Field of Search ................................ 709/105, 245, 709/227, 240, 246, 249, 241, 239; 370/401, 400, 409, 392, 395.32, 428

(56) References Cited

U.S. PATENT DOCUMENTS 5,371,852 A * 12/1994 Attanasio et al. ............ 709/245
5,774,660 A    6/1998 Brendel et al. ......... 395/200.31

(List continued on next page.)

FOREIGN PATENT DOCUMENTS

| EP | 817 444 A2 | 1/1998 |
|---|---|---|
| EP | 865 180 A2 | 9/1998 |
| WO | WO 98/26559 | 6/1998 |
| WO | WO 99/33227 | 7/1999 |

OTHER PUBLICATIONS

Publication, entitled "One–IP: techniques for hosting a service on a cluster of machines," by Om P. Damani et al., Computer Networks and ISDN Systems 29 (1997) 1019–1027.

Publication, entitled "Network Dispatcher: a connection router for scalable Internet services," to Guerney D.H. Hunt et al., Computer Networks and ISDN Systems 30 (1998) 347–357.

Publication, entitled "Load Management for Scaling up Internet Services," to German S. Goldszmidt, IBM T. J. Watson Research Group Feb. 15, 1998, p. 828–835.

*Primary Examiner*—Wellington Chin
*Assistant Examiner*—Chuong Ho
(74) *Attorney, Agent, or Firm*—Park, Vaughan & Fleming LLP

(57) ABSTRACT

One embodiment of the present invention provides a system that uses a destination address of a packet to perform a fast lookup to determine a service that is specified by the destination address. The system initially receives a packet at an interface node in the cluster of nodes. This packet includes a source address specifying a location of a client that the packet originated from, and the destination address specifying a service provided by the cluster of nodes. The system uses the destination address to perform a first lookup into a first lookup structure containing identifiers for scalable services. Note that a scalable service is a service that provides more server node capacity for the scalable service as demand for the scalable service increases. If no identifier for a scalable service is returned during the first lookup, the system sends the packet to a server node in the cluster of nodes that provides a non-scalable service.

22 Claims, 7 Drawing Sheets

U.S. PATENT DOCUMENTS

| | | |
|---|---|---|
| 5,918,017 A | 6/1999 | Attanasio et al. ...... 395/200.54 |
| 5,938,732 A | 8/1999 | Lim et al. .................... 709/229 |
| 5,964,886 A | 10/1999 | Slaughter et al. .............. 714/4 |
| 6,097,882 A | 8/2000 | Mogul .................. 395/200.31 |
| 6,112,279 A * | 8/2000 | Wang ......................... 711/119 |
| 6,185,619 B1 | 2/2001 | Joffee et al. ................ 709/229 |
| 6,195,680 B1 | 2/2001 | Goldszmidt et al. ........ 709/203 |
| 6,226,684 B1 | 5/2001 | Sung et al. .................. 709/238 |
| 6,247,141 B1 | 6/2001 | Holmberg ...................... 714/2 |
| 6,253,230 B1 * | 6/2001 | Couland et al. ............ 709/203 |
| 6,256,675 B1 | 7/2001 | Rabinovich ................. 709/241 |
| 6,292,905 B1 * | 9/2001 | Wallach et al. ................ 714/4 |
| 6,360,262 B1 * | 3/2002 | Guenthner et al. ......... 709/226 |
| 6,363,077 B1 | 3/2002 | Wong et al. ................. 370/422 |
| 6,424,992 B2 * | 7/2002 | Devarakonda et al. ...... 709/203 |
| 6,438,652 B1 | 8/2002 | Jordan et al. ............... 711/120 |
| 6,445,709 B1 | 9/2002 | Chiang ....................... 370/399 |
| 6,470,389 B1 * | 10/2002 | Chung et al. ............... 709/227 |
| 6,667,980 B1 * | 12/2003 | Modi et al. ............ 370/395.32 |

* cited by examiner

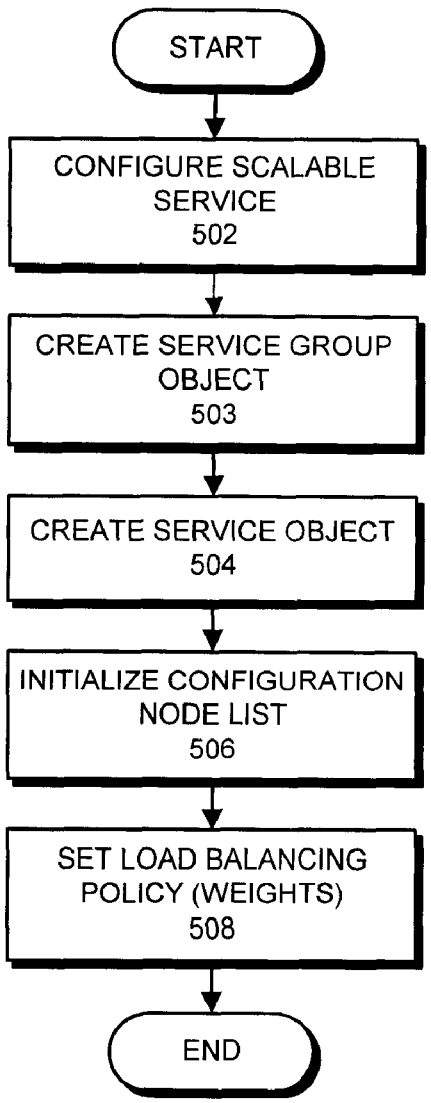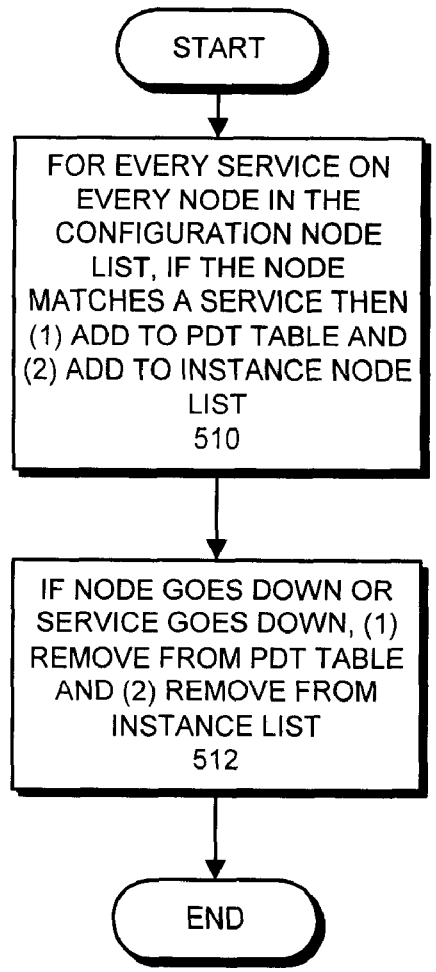
FIG. 5A
FIG. 5B

METHOD AND APPARATUS FOR PERFORMING A FAST SERVICE LOOKUP IN CLUSTER NETWORKING

RELATED APPLICATIONS

The subject matter of this patent application is related to the subject matter in the following co-pending non-provisional patent applications filed on the same day as the instant application: (1) "Method and Apparatus for Providing Scalable Services Using a Packet Distribution Table," by inventors Sohrab F. Modi, Sankar Ramamoorthi, Mahalingam Mani, Brian M. Oki, Kevin C. Fox and Hariprasad B. Mankude, Ser. No. 09/480,147, filing date TO BE ASSIGNED (2) "Method and Apparatus for Fast Packet Forwarding in Cluster Networking," by inventors Hariprasad B. Mankude and Sohrab F. Modi, Ser. No. 09/480,145, filing date TO BE ASSIGNED (3) "Network Client Affinity For Scalable Services," by inventors Sohrab F. Modi, Sankar Ramamoorthi, Kevin C. Fox, and Tom Lin, Ser. No. 09/480,280, filing date TO BE ASSIGNED and (4) "Method For Creating Forwarding Lists For Cluster Networking," by inventors Hariprasad B. Mankude, Sohrab F. Modi, Sankar Ramamoorthi, Mani Mahalingam and Kevin C. Fox, Ser. No. 09/480,788, filing date TO BE ASSIGNED.

BACKGROUND

1. Field of the Invention

The present invention relates to clustered computer systems with multiple nodes that provide services in a scalable manner. More specifically, the present invention relates to a method and an apparatus that uses a destination address to perform a fast lookup to determine a service for a packet.

2. Related Art

The recent explosive growth of electronic commerce has led to a proliferation of web sites on the Internet selling products as diverse as toys, books and automobiles, and providing services, such as insurance and stock trading. Millions of consumers are presently surfing through web sites in order to gather information, to make purchases, or purely for entertainment.

The increasing traffic on the Internet often places a tremendous load on the servers that host web sites. Some popular web sites receive over a million "hits" per day. In order to process this much traffic without subjecting web surfers to annoying delays in retrieving web pages, it is necessary to distribute the traffic between multiple server nodes, so that the multiple server nodes can operate in parallel to process the traffic.

In designing such a system to distribute traffic between multiple server nodes, a number of characteristics are desirable. It is desirable for such a system to be efficient in order to accommodate as much traffic as possible with a minimal amount of response time. It is desirable for such a system to be "scalable," so that additional server nodes can be added an distribution to the nodes can be modifiable to provide a service as demand for the service increases. In doing so, it is important to ensure that response time does not increase as additional server nodes are added. It is also desirable for such a system to be constantly available, even when individual server nodes or communication pathways between server nodes fail.

A system that distributes traffic between multiple server nodes typically performs a number of tasks. Upon receiving a packet, the system looks up a service that the packet is directed to. (Note that a collection of server nodes will often host a number of different servers.) What is needed is a method and an apparatus for performing a service lookup that is efficient, scalable and highly available.

Once the service is determined, the system distributes workload involved in providing the service between the server nodes that are able to provide the service. For efficiency reasons it is important to ensure that packets originating from the same client are directed to the same server. What is needed is a method and an apparatus for distributing workload between server nodes that is efficient, scalable and highly available.

Once a server node is selected for the packet, the packet is forwarded to the server node. The conventional technique of using a remote procedure call (RPC) or an interface definition language (IDL) call to forward a packet typically involves traversing an Internet Protocol (IP) stack from an RPC/IDL endpoint to a transport driver at the sender side, and then traversing another IP stack on the receiver side, from a transport driver to an RPC/IDL endpoint. Note that traversing these two IP stacks is highly inefficient. What is needed is a method and an apparatus for forwarding packets to server nodes that is efficient, scalable and highly available.

SUMMARY

One embodiment of the present invention provides a system that uses a destination address of a packet to perform a fast lookup to determine a service that is specified by the destination address. The system initially receives a packet at an interface node in the cluster of nodes. This packet includes a source address specifying a location of a client that the packet originated from, and the destination address specifying a service provided by the cluster of nodes. The system uses the destination address to perform a first lookup into a first lookup structure containing identifiers for scalable services. Note that a scalable service is a service that provides more server node capacity for the scalable service as demand for the scalable service increases. If no identifier for a scalable service is returned during the first lookup, the system sends the packet to a server node in the cluster of nodes that provides a non-scalable service.

In one embodiment of the present invention, if an identifier for a scalable service is returned for the packet, the system looks up a server node to send the packet to, based upon the source address of the packet (and possibly the destination address of the packet) and sends the packet to the server node.

In one embodiment of the present invention, the system looks up the server node by performing a function that maps the source address to an entry in a packet distribution table (PDT), which includes entries containing identifiers for server nodes. In a variation on this embodiment, the function is a hash function that maps different source addresses to different entries in the packet distribution table in a substantially random manner, so that a given source address always maps to the same entry in the packet distribution table.

In one embodiment of the present invention, the system allows the server node to send return communications directly to the client without forwarding the return communications through the interface node.

In one embodiment of the present invention, the first lookup structure is a hash table containing the identifiers for the scalable services.

In one embodiment of the present invention, if the first lookup does not return an identifier for a scalable service, the system uses the destination address to perform a second lookup into a second lookup structure containing identifiers for scalable services. In a variation on this embodiment, the first lookup is based upon an Internet Protocol (IP) address and an associated port number, and the second lookup is based upon the IP address without the associated port number.

In one embodiment of the present invention, the first lookup structure includes identifiers for scalable services that use a first load balancing policy to distribute packets between server nodes, and the second lookup structure includes identifiers for scalable services that use a second load balancing policy. In a variation on this embodiment, the second load balancing policy locates related services for a given client on the same server node.

In one embodiment of the present invention, if no scalable service is returned for the packet, the system allows a server instance on the interface node to provide the service.

In one embodiment of the present invention, the system periodically sends checkpointing information from a PDT server node to a secondary PDT server node so that the secondary PDT server node is kept in a consistent state with the PDT server node. This allows the secondary PDT server node to take over for the PDT server node if the PDT server node fails.

In one embodiment of the present invention, the system periodically sends checkpointing information from a master PDT server node to at least one slave PDT server node so that the slave PDT servers are kept in a consistent state with the master PDT server.

In one embodiment of the present invention, the destination address includes an Internet Protocol (IP) address, an associated port number for the service and a protocol identifier (such as transmission control protocol (TCP) or user datagram protocol (UDP)).

BRIEF DESCRIPTION OF THE FIGURES

FIG. 5A is a flow chart illustrating the process of service registration in accordance with an embodiment of the present invention.

FIG. 5B is a flow chart illustrating the process of service activation/deactivation in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Clustered Computing System

Figure 1:
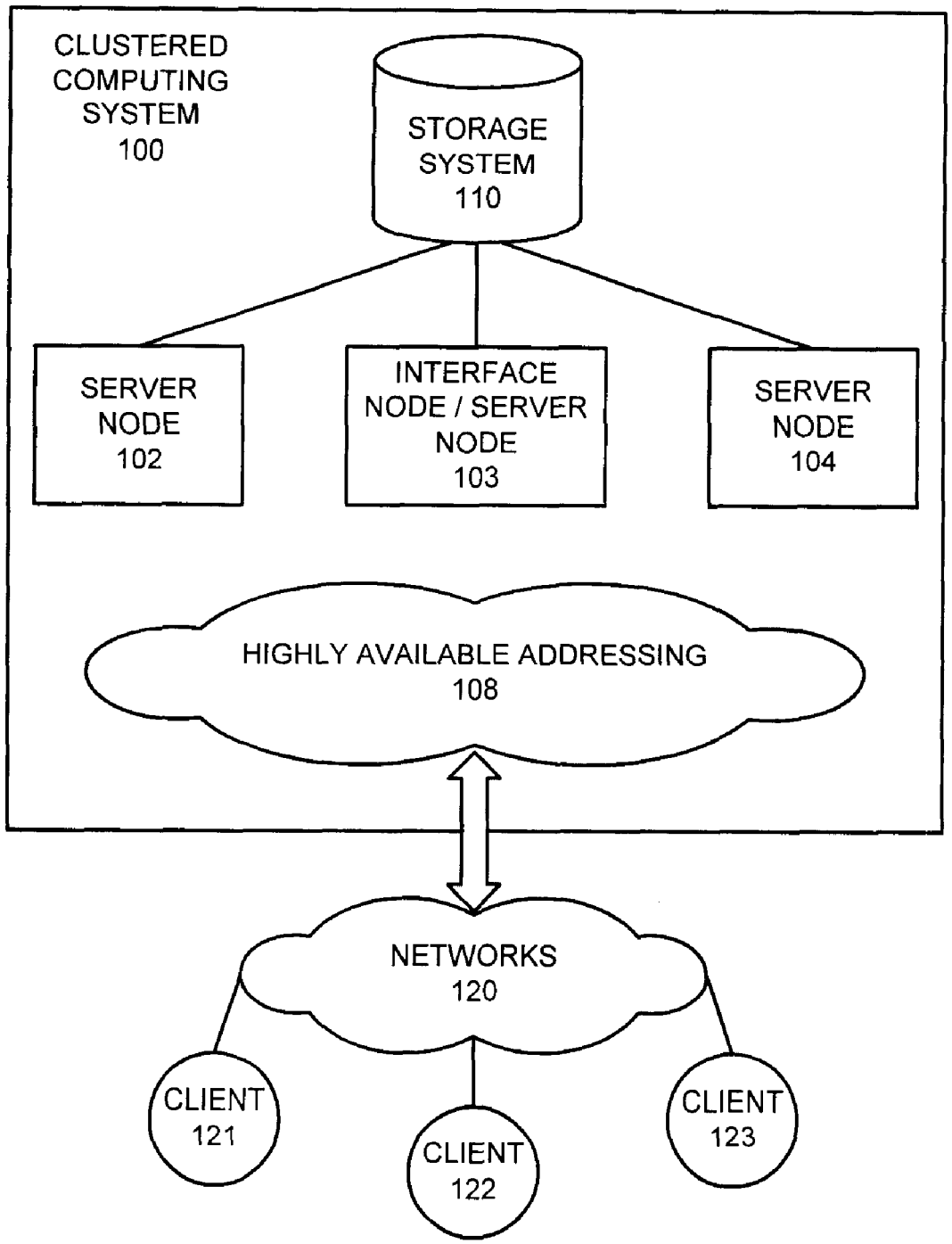
FIG. 1 illustrates a clustered computing system coupled to client computing systems through a network in accordance with an embodiment of the present invention.

FIG. 1 illustrates a clustered computing system 100 coupled to clients 121–123 through networks 120 in accordance with an embodiment of the present invention. Clients 121–123 can include any node on networks 120, including computational capability and including a mechanism for communicating across networks 120. Clients 121–123 communicate with clustered computing system 100 by sending packets to clustered computing system 100 in order to request services from clustered computing system 100.

Networks 120 can include any type of wire or wireless communication channel capable of coupling together computing nodes. This includes, but is not limited to, a local area network, a wide area network, or a combination of networks. In one embodiment of the present invention, networks 120 includes the Internet.

Clustered computing system 100 includes a set of nodes that are coupled together through a communication channel (not shown). These nodes include server nodes 102 and 104 as well as interface node/server node 103. Nodes 102–104 are coupled to storage system 110. Storage system 110 provides archival storage for code and or data that is manipulated by nodes 102–104. This archival storage may include, but is not limited to, magnetic storage, flash memory, ROM, EPROM, EEPROM, and battery-backed-up RAM.

Nodes 102–104 are coupled together through a private interconnect with redundant pathways (not shown). For example, nodes 102–104 can be interconnected through a communication mechanism adhering to the Ethernet or a scalable coherent interconnect (SCI) standards. A path manager operates on all of the nodes in clustered computing system 100. This path manager knows about the interconnect topology and monitors the status of pathways. The path manager also provides an interface registry to which other components interested in the status of the interconnect can register. This provides a mechanism for the path manager to make callbacks to the interested components when the status of a path changes, if a new path comes up, or if a path is removed.

Nodes 102–104 are coupled to networks 120 through a highly available addressing system 108. Highly available addressing system 108 allows interface nodes within clustered computing system 100 to be addressed from networks 120 in a "highly-available" manner so that if an interface node fails, a backup secondary interface node is able to take its place without the failure being visible to clients 121–123. Note that interface node 103 can host one or more shared IP addresses for clustered computing system 100. Also note, than more that one node in clustered computing system 100 can act as an interface node for a given service. This allows a backup interface node to take over for an interface node that fails.

Note that nodes 102–104 within clustered computing system 100 can provide scalable services. Each scalable service behaves as a single logical entity from the view of clients 121–123. Also note that clients 121–123 can communicate with clustered computing system 100 through a transmission control protocol (TCP) connection or a user datagram protocol (UDP) session.

As load on a service increases, the service attempts to maintain the same per-client response time. A service is said to be "scalable" if increased load on the service is matched with an increase in hardware and server instances that are performing the service. For example, a web server is scalable if additional load on the web server is matched by a corresponding increase in server nodes to process the additional load, or by a change in the distribution of the load across the hardware and server instances that are performing the service.

Clustered computing system 100 operates generally as follows. As packets arrive at interface node 103 from clients 121–123, a service is selected for the packet based on the destination address in the packet. Next, a server instance is selected for the packet based upon the source address of the packet as well as the destination address of the packet. Note that the system ensures that packets belonging to the same TCP connection or UDP instance are sent to the same server instance. Finally, the packet is sent to the selected server instance.

Internal Structure of Interface Nodes and Server Nodes

Figure 2:
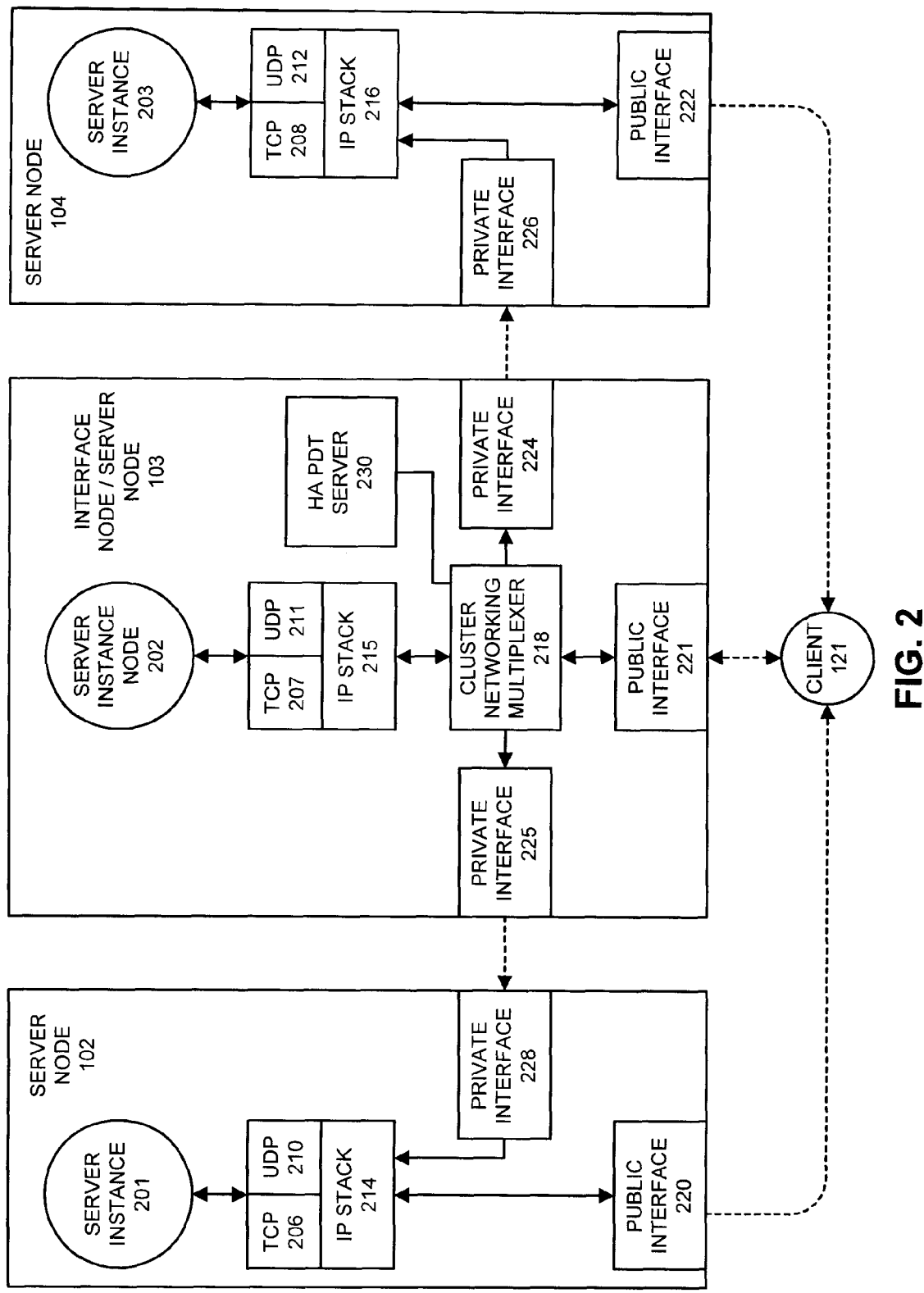
FIG. 2 illustrates the internal structure of an interface node and two server nodes within a clustered computing system in accordance with an embodiment of the present invention.

FIG. 2 illustrates the internal structure of interface node 103 and server nodes 102 and 104 within clustered computing system 100 in accordance with an embodiment of the present invention. Client 121 sends packets to clustered computing system 100 in order to receive a service from clustered computing system 100. These packets enter public interface 221 within interface node 103 in clustered computing system 100. Public interface 221 can include any type of interface that is able to receive packets from networks 120.

As packets arrive at interface node 103 via public interface 221, they pass through cluster networking multiplexer 218. Cluster networking multiplexer 218 forwards the packets to various nodes within clustered computing system 100 based upon load balancing policies and other considerations. In making forwarding decisions, cluster networking multiplexer 218 retrieves data from highly available PDT server 230. The structure of this data is described in more detail below with reference to FIG. 3. Note that HA PDT server 230 may be replicated across multiple nodes of clustered computing system 100 so that in case a node fails, a backup node can take over for it to maintain availability for HA PDT server 230.

Packets are forwarded from interface node 103 to other nodes clustered computing system 100, including server nodes 102 and 104, through private interfaces 224 and 225. Private interfaces 224 and 225 can include any interface that can handle communications between nodes within clustered computing system 100. For example, packets can be forwarded from private interface 224 to private interface 226 on server node 104, or from private interface 225 to private interface 228 on server node 102. Note that private interfaces 224 and 225 do not handle communications with entities outside of clustered computing system 100.

In some embodiments of the present invention, private interface 224 (and 225) and public interface 221 share some of the same communication hardware and send messages down some of the same physical data paths. In some of these embodiments, private interface 224 and public interface 221 may also share some of the same interface software. Hence, private interface 224 and public interface 221 need not represent different communication mechanisms. Therefore, the distinction between private interface 224 and public interface 221 can be merely a distinction between whether the communications are with an entity outside of clustered computing system 100, or with an entity within clustered computing system 100.

Packets entering server nodes 102 and 104 pass through IP stacks 214 and 216, respectively. Cluster networking multiplexer 218 can also send packets to IP stack 215 within interface node/server node 103, because node 103 is also able to act as a server. On server node 102, packets pass through IP stack 214 into TCP module 206, which supports TCP connections, or into UDP module 210, which supports UDP sessions. Similarly, on interface node/server node 103, packets pass through IP stack 215 into TCP module 207, or into UDP module 211. On server node 104, packets pass through IP stack 216 into TCP module 208, or into UDP module 212. Next, the packets are processed by server instances 201–203 on nodes 102–104, respectively.

Note that return communications for server nodes 102 and 104 do not follow the same path. Return communication from server node 102 pass down through IP stack 214, through public interface 220 and then to client 121. Similarly, return communications from server node 104 pass down through IP stack 216, through public interface 222 and then to client 121. This frees interface node 103 from having to handle return communication traffic.

For web server applications (and some other applications), this return communication mechanism can provide load balancing for the return traffic. Note that web servers typically receive navigational commands from a client, and in response send large volumes of web page content (such as graphical images) back to the client. For these applications, it is advantageous to distribute the return traffic over multiple return pathways to handle the large volume of return traffic.

Note that within a server node, such as server node 104, shared IP addresses are hosted on the "loopback interface" of server node 104. (The loopback interface is defined within the UNIX and SOLARIS™ operating system standards. Solaris is a trademark of Sun Microsystems, Inc. of Palo Alto, Calif.). Hosting a shared IP address on a loopback interface has failover implications. The first interface in the loopback is typically occupied by the loopback address (for example, 127.0.0.1), which will not fail over. This prevents a problem in which failing over an IP address that occupies the physical space of an interface causes configuration data to be lost for logical adapters associated with other IP addresses hosted on the same interface.

Data Structures to Support Scalable Services

Figure 3:
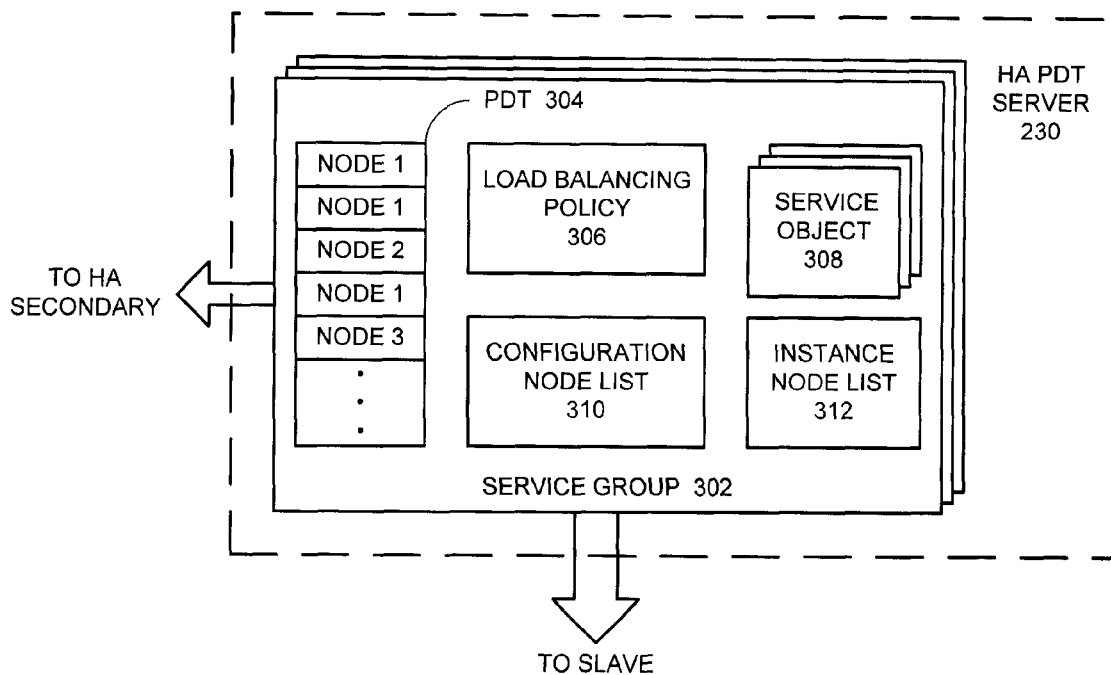
FIG. 3 illustrates data structures associated with a scalable service in accordance with an embodiment of the present invention.

FIG. 3 illustrates data structures associated with a scalable service in accordance with an embodiment of the present invention. HA PDT server 230 contains at least one service group 302. Note that service group 302 can be associated with a group of services that share a load balancing policy.

Also note that service group 302 may have an associated secondary version on another node for high availability purposes. Any changes to service group 302 may be check-pointed to this secondary version so that if the node containing the primary version of service group 302 fails, the node containing the secondary version can take over.

Service group 302 may also be associated with a number of "slave" versions of the service object located on other nodes in clustered computing system 100. This allows the other nodes to access the data within service group 302. Any changes to service group 302 may be propagated to the corresponding slave versions.

Service group 302 includes a number of data structures, including packet distribution table (PDT) 304, load balancing policy 306, service object 308, configuration node list 310 and instance node list 312.

Configuration node list 310 contains a list of server nodes within clustered computing system 100 that can provide the services associated with service group 302. Instance node list 312 contains a list of the nodes that are actually being used to provide these services. Service object 308 contains information related to one or more services associated with service group 302.

Load balancing policy 306 contains a description of a load balancing policy that is used to distribute packets between nodes involved in providing services associated with service group 302. For example, a policy may specify that each node in instance node list 312 receives traffic from a certain percentage of the source addresses of clients that request services associated with service group 302.

PDT 304 is used to implement the load balancing policy. PDT 304 includes entries that are populated with identifiers for nodes that are presently able to receive packets for the services associated with service group 302. In order to select a server node to forward a packet to, the system hashes the source address of the client that sent the packet over PDT 304. This hashing selects a particular entry in PDT 304, and this entry identifies a server node within clustered computing system 100.

Note that any random or pseudo-random function can be used to hash the source address. However, it is desirable for packets with the same source address to map to the same server node in order to support a TCP connection (or UDP session) between a client and the server node.

Also note that the frequency of entries can be varied to achieve different distributions of traffic between different server nodes. For example, a high performance server node that is able to process a large amount of traffic can be given more entries in PDT 304 than a slower server node that is able to process less traffic. In this way, the high-performance server node will on average receive more traffic than the slower server node.

Figure 9:
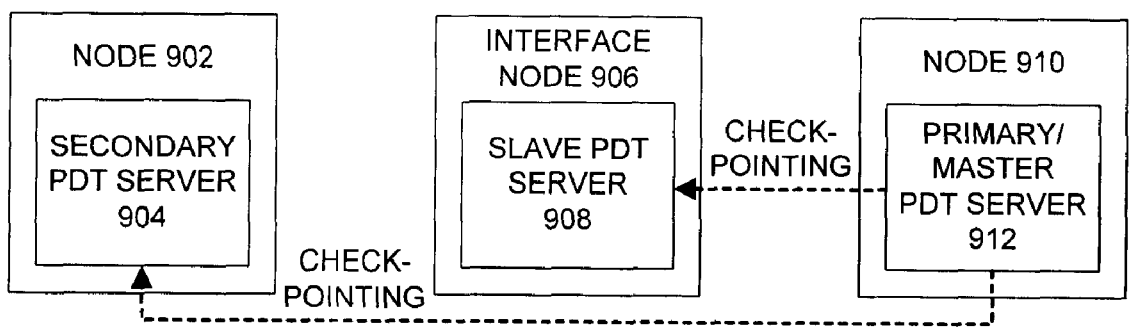
FIG. 9 illustrates how a PDT server is checkpointed to a slave PDT server and a secondary PDT server in accordance with an embodiment of the present invention.

Also note that if a PDT server fails with configuration data present in its local memory, then a secondary PDT server will take over. A checkpointing process ensures that the configuration data will also be present in the local memory for the secondary PDT server. More specifically, FIG. 9 illustrates how a PDT server is checkpointed to a slave PDT server and a secondary PDT server in accordance with an embodiment of the present invention. As illustrated in FIG. 9, the system maintains a primary/master PDT server 912 on node 910. For high availability purposes, the state of primary/master PDT server 912 is regularly checkpointed to secondary PDT server 904 on node 902 so that secondary PDT server 904 is kept consistent with primary/master PDT server 912. In this way, if primary/master PDT server 912 fails, secondary PDT server 904 is able to take its place.

If primary/master PDT server 912 is not located on an interface node 906, a slave PDT server 908 is maintained on interface node 906 for performance reasons (not high availability reasons). In this case, most of the state of primary/master PDT server 912 is regularly checkpointed to slave PDT server 908 in interface node 906. This allows interface node 906 to access the information related to packet forwarding locally, within slave PDT server 908, without having to communicate with node primary/master PDT server 912 on node 910.

Packet Forwarding

Figure 4:
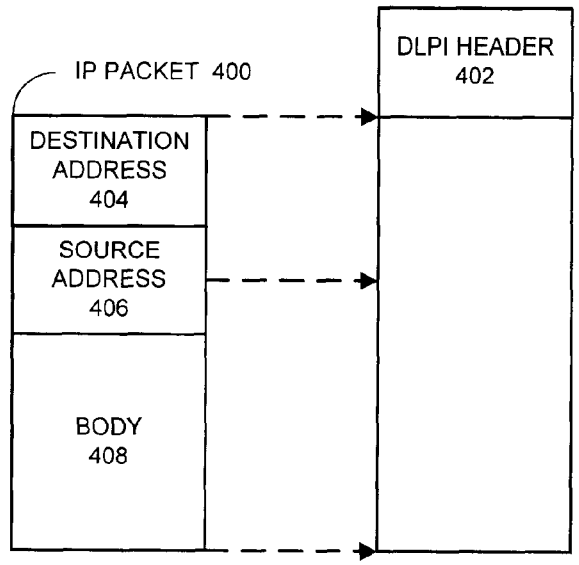
FIG. 4 illustrates how an IP packet is encapsulated with a DLPI header in accordance with an embodiment of the present invention.

FIG. 4 illustrates how an IP packet 400 is encapsulated with a DLPI header 402 in accordance with an embodiment of the present invention. In order for an IP packet 400 to be forwarded between interface node 103 and server node 104 (see FIG. 2), DLPI header 402 is attached to the head of IP packet 400. Note that DLPI header 402 includes the medium access control (MAC) address of one of the interfaces of the destination server node 104. Also note that IP packet 400 includes a destination address 404 that specifies an IP address of a service that is hosted by interface node 103, as well as the source address 406 for a client that sent the packet.

Configuration Process

FIG. 5A is a flow chart illustrating the process of service registration in accordance with an embodiment of the present invention. The system starts by attempting to configure a scalable service for a particular IP address and port number (step 502). The system first creates a service group object (step 503), and then creates a service object for the scalable service (step 504). The system also initializes a configuration node list 310 (see FIG. 3) to indicate which server nodes within clustered computing system 100 are able to provide the service (step 506), and sets load balancing policy 306 for the service. Note that a particular load balancing policy can specify weights for the particular server nodes (step 508).

FIG. 5B is a flow chart illustrating the process of service activation/deactivation in accordance with an embodiment of the present invention. This process happens whenever an instance is started or stopped, or whenever a node fails. For every scalable service, the system examines every node on the configuration node list 310. If the node matches the running version of the scalable service, then the node is added to PDT 304 and to instance node list 312 (step 510).

If at some time in the future a node goes down or the service does down, a corresponding entry is removed from PDT 304 and instance node list 312 (step 512).

Packet Processing

Figure 6:
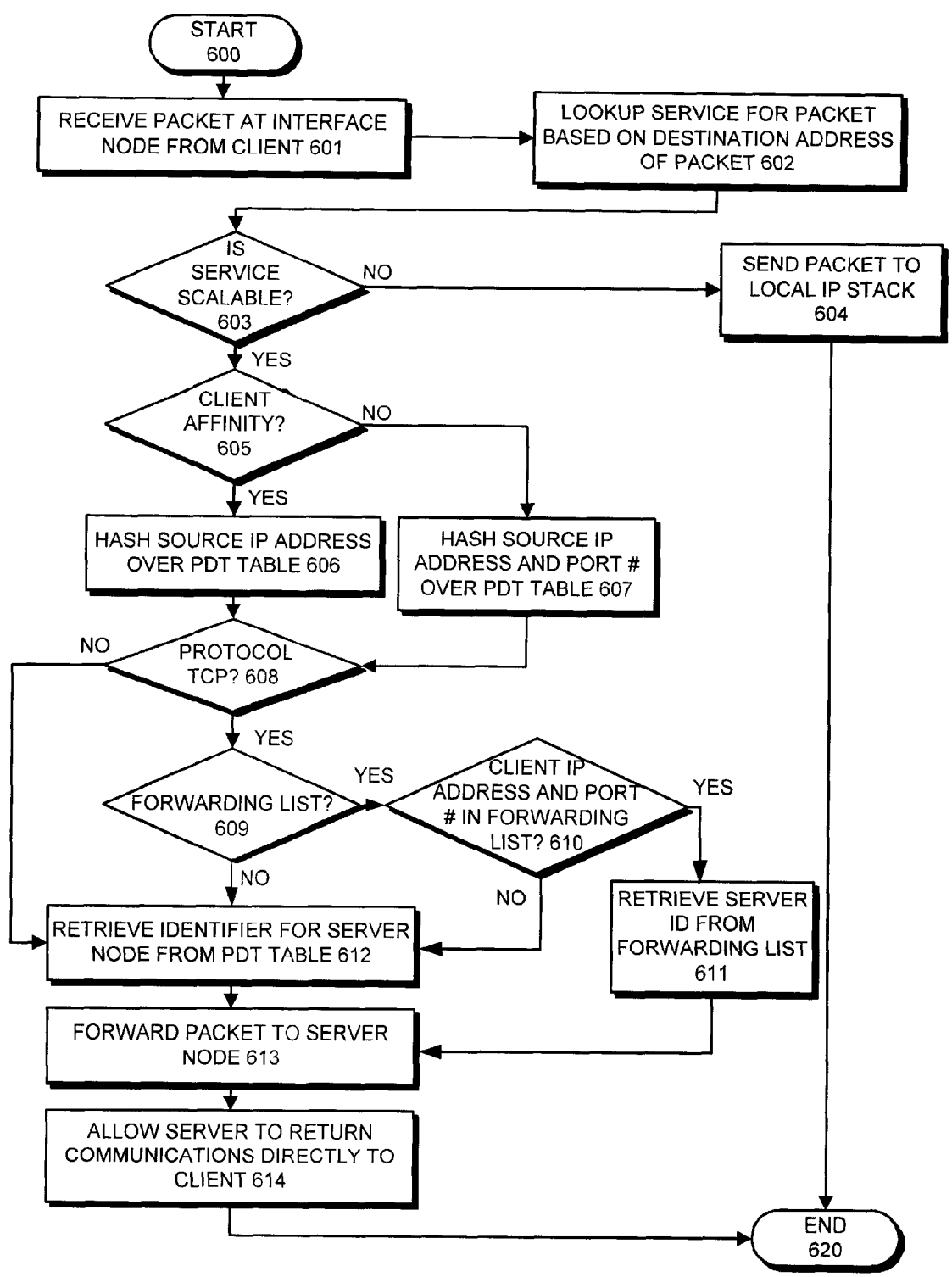
FIG. 6 is a flow chart illustrating how a packet is processed within an interface node in accordance with an embodiment of the present invention.

FIG. 6 is a flow chart illustrating how a packet is processed within an interface node in accordance with an embodiment of the present invention. The system starts by receiving IP packet 400 from client 122 at cluster networking multiplexer 218 within interface node 103 (step 601). IP packet 400 includes a destination address 404 specifying a service, and a source address 406 of the client that sent the packet.

The system first looks up a service for the packet based upon destination address 404 (step 602). This lookup process is described in more detail with reference to FIG. 7 below.

The system next determines if the server is a scalable service (step 603). If not, the system sends the packet to IP stack 215 within interface node/server node 103, so that server instance 202 can provide the non-scalable service (step 604). Alternatively, interface node 103 can send the packet to a default server node outside of interface node/server node 103 to provide the non-scalable service. For example, server node 104 can be appointed as a default node for non-scalable services.

If the service is a scalable service, the system determines which server node to send the packet to. In doing so, the system first determines whether the packet is subject to client affinity (step 605). If so, the system hashes the source IP address over PDT 304 to select an entry from PDT 304 (step 606). If not, the system hashes the source IP address and the port number over PDT table 304 (step 607).

Next, the system determines if is the protocol is TCP (step 608). If the protocol is not TCP (meaning it is UDP), the system retrieves an identifier for a server node from the entry (step 611). Otherwise if the protocol is TCP, the system determines whether the current IP number and address are in a forwarding list (step 609). If so, the system retrieves the server identifier from the forwarding list (step 610). Otherwise, the system retrieves the server identifier from the selected entry in PDT 304 (step 611).

Next, the system forwards the packet to the server node (step 612). This forwarding process is described in more detail below with reference to FIG. 8.

Interface node 103 then allows the selected server node to send return communications directly back to the client (step 614).

Process of Looking up a Service

Figure 7:
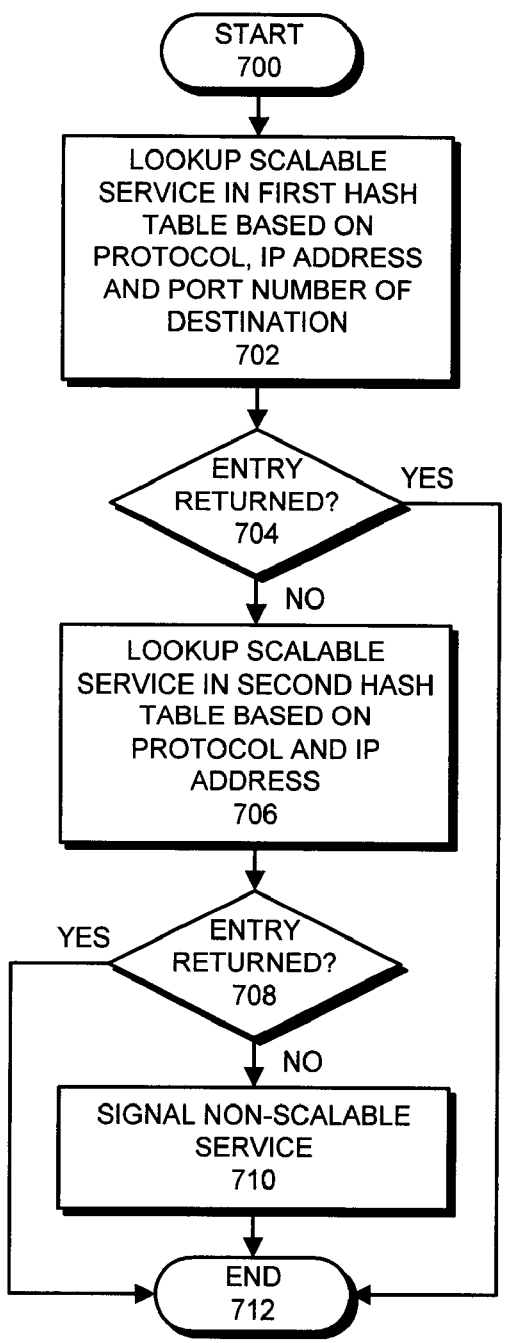
FIG. 7 is a flow chart illustrating the process of looking up a service for a packet in accordance with an embodiment of the present invention.

FIG. 7 is a flow chart illustrating the process of looking up a service for a packet in accordance with an embodiment of the present invention. The system starts by performing a look up based upon the destination address in a first hash table (step 702). This lookup involves using the protocol, IP address and port number of the service. If an entry is returned during this lookup, the process is complete and a scalable service is returned.

Otherwise, the system looks up a scalable service in a second hash table based upon the destination address (step 706). In this case, only the protocol and the IP address are used to perform the lookup. This is because the second lookup involves a scalable service with a "client affinity" property. This client affinity property attempts to ensure that related services are performed on the same server node for the same client. Hence, the second hash table associates related services with the same IP address but with different port numbers with the same server node.

If no entry is returned in the second lookup, then the service is a non-scalable service and the system signals this fact (step 710). Otherwise, if an entry is returned in the second lookup, the process is complete and a scalable service of the second type is returned.

In one embodiment of the present invention, the first lookup selects services to be associated with one load balancing policy and the second lookup selects services to be associated with a second, different load balancing policy.

Process of Forwarding a Packet

Figure 8:
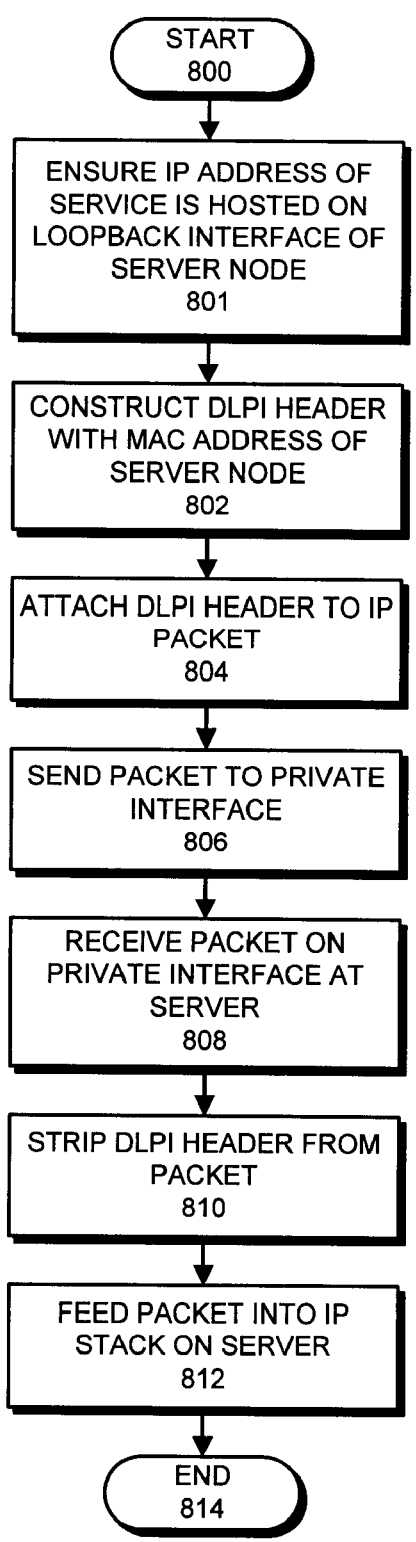
FIG. 8 is a flow chart illustrating the process of forwarding a packet to a server in accordance with an embodiment of the present invention.

FIG. 8 is a flow chart illustrating the process of forwarding a packet to a server in accordance with an embodiment of the present invention. At some time during an initialization process, the system ensures that the IP address of a service is hosted on the loopback interface of each server node that will be used to perform the service (step 801). This allows each server node to process packets for the service, in spite of the fact that the service is not hosted on a public interface of the server node. After an IP packet 400 is received and after a service and a server node are selected (in step 612 of FIG. 6), the system forwards IP packet 400 from cluster networking multiplexer 218 in interface node 103 to IP stack 216 within server node 104. This involves constructing a DLPI header 402, including the MAC address of server node 104 (step 802), and then attaching DLPI header 402 to IP packet 400 (see FIG. 4) (step 804).

Next, the system sends the IP packet 400 with DLPI header 402 to private interface 224 within interface node 103 (step 806). Private interface 224 sends IP packet 400 with DLPI header 402 to server node 104. Server node 104 receives the IP packet 400 with DLPI header 402 at private interface 226 (step 808). Next, a driver within server node 104 strips DLPI header 402 from IP packet 400 (step 810). IP packet 400 is then fed into the bottom of IP stack 216 on server node 104 (step 812). IP packet 400 subsequently passes through IP stack 216 on its way to server instance 203.

Note that the conventional means of using a remote procedure call (RPC) or an interface definition language (IDL) call to forward a packet from interface node 103 to server node 104 involves traversing an IP stack from an RPC/IDL endpoint to private interface 224 within interface node 103, and then traversing another IP stack again at server node 104 from private interface 226 to an RPC/IDL endpoint. This involves two IP stack traversals, and is hence, highly inefficient.

In contrast, the technique outlined in the flowchart of FIG. 8 eliminates the two IP stack traversals.

Also note that, in forwarding the packet to the server node, the system can load balance between multiple redundant paths between the interface node and the server node by using a distribution mechanism such as a PDT.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for performing a fast lookup to determine a service being provided by server nodes within a cluster of nodes, the method comprising:

receiving a packet at an interface node in the cluster of nodes, the packet including a source address specifying a location of a client that the packet originated from, and a destination address specifying a service provided by the cluster of nodes;

using the destination address to perform a first lookup into a first lookup structure containing identifiers for scalable services, wherein a scalable service is a service that provide more server node capacity for the scalable service as demand for the scalable service increases;

if an identifier for the scalable service is returned for the packet,
  looking up a server node in the cluster of nodes to send the packet to based upon the source address of the packet, and
  sending the packet to the server node;

if no identifier for the scalable service is returned for the packet, sending the packet to a server instance in the cluster of nodes that provides a non-scalable service; and allowing the server node to send return communications directly to the client without forwarding the return communications through the interface node.

2. The method of claim 1, wherein looking up the server node comprises mapping the source address to an entry in a packet distribution table, the packet distribution table including entries containing identifiers for server nodes in the cluster of nodes; and wherein mapping the source address includes using a hash function that maps different source addresses to different entries in the packet distribution table in a substantially random manner, and wherein the hash function always maps a given source address to the same entry in the packet distribution table.

3. The method of claim 1, wherein the first lookup structure is a hash table containing the identifiers for the scalable services.

4. The method of claim 1, further comprising if the first lookup does not return an identifier for a scalable service, using the destination address to perform a second lookup into a second lookup structure containing identifiers for scalable services.

5. The method of claim 4, wherein the first lookup structure includes identifiers for scalable services that use a first load balancing policy to distribute packets between server nodes, and wherein the second lookup structure includes identifiers for scalable services that use a second load balancing policy.

6. The method of claim 1, wherein a scalable service is provided by multiple server nodes in the cluster of nodes so that the scalable service provides more server node capacity for the scalable service as demand for the scalable service increases.

7. The method of claim 6, wherein the second load balancing policy keeps related services for a given source address on the same server node.

8. The method of claim 1, further comprising if no scalable service is returned for the packet, sending the packet to a server instance on the interface node.

9. The method of claim 1, further comprising:

periodically sending checkpointing information from a primary packet distribution table (PDT) server to a secondary PDT server so that the secondary PDT server is kept in a consistent state with the primary PDT server; and if the primary PDT server fails, allowing the secondary PDT server to take over for the primary PDT server.

10. The method of claim 1, further comprising periodically sending checkpointing information from a master packet distribution table (PDT) server to a slave PDT server located on the interface node.

11. A computer readable storage medium storing instructions that when executed by a computer cause the computer to perform a method for performing a fast lookup to determine a service being provided by server nodes within a cluster of nodes, comprising:

receiving a packet at an interface node in the cluster of nodes, the packet including a source address specifying a location of a client that the packet originated from, and the a destination address specifying a service provided by the cluster of nodes;

using the destination address to perform a first lookup into a first lookup structure containing identifiers for scalable services, a scalable service being provided by multiple server nodes in the cluster of nodes so that the scalable service provides more server node capacity for the scalable service as demand for the scalable service increases, wherein a scalable service is a service that provide more server node capacity for the scalable service as demand for the scalable service increases;

if an identifier for the scalable service is returned for the packet, looking up a server node in the cluster of nodes to send the packet to based upon the source address of the packet, and sending the packet to the server node;

if no identifier for a scalable service is returned for the packet, sending the packet to a server node in the cluster of nodes that provides a non-scalable service; and allowing the server node to send return communications directly to the client without forwarding the return communications through the interface node.

12. The computer-readable storage medium of claim 11, wherein looking up the server node comprises mapping the source address to an entry in a packet distribution table, the packet distribution table including entries containing identifiers for server nodes in the cluster of nodes; and wherein mapping the source address includes using a hash function that maps different source addresses to different entries in the packet distribution table in a substantially random manner, and wherein the hash function always maps a given source address to the same entry in the packet distribution table.

13. The computer-readable storage medium of claim 11, wherein the first lookup structure is a hash table containing the identifiers for the scalable services.

14. The computer-readable storage medium of claim 11, wherein the method further comprises, if the first lookup does not return an identifier for a scalable service, using the destination address to perform a second lookup into a second lookup structure containing identifiers for scalable services.

15. The computer-readable storage medium of claim 11, wherein the method further comprises periodically sending checkpointing information from a primary packet distribution table (PDT) server to a secondary PDT server so that the secondary PDT server is kept in a consistent state with the primary PDT server; and if the primary PDT server fails, allowing the secondary PDT server to take over for the primary PDT server.

16. The computer-readable storage medium of claim 11, wherein the method further comprises periodically sending checkpointing information from a master packet distribution table (PDT) server to a slave PDT server located on the interface node.

17. An apparatus that performs a fast lookup to determine a service being provided by server nodes within a cluster of nodes, comprising:

a receiving mechanism that is configured to receive a packet at an interface node in the cluster of nodes, the packet including a source address specifying a location of a client that the packet originated from, and a destination address specifying a service provided by the cluster of nodes;

a first lookup mechanism that is configured to use the destination address to perform a first lookup into a first lookup structure containing identifiers for scalable services, a scalable service being provided by multiple server nodes in the cluster of nodes so that the scalable service provides more server node capacity for the scalable service as demand for the scalable service increases; and a server node identification mechanism, wherein if an identifier for the scalable service is returned for the packet, the server node identification mechanism is configured to look up a server node in the cluster of nodes to send the packet to based upon the source address of the packet; and a sending mechanism that is configured to send the packet to the server node, wherein the sending mechanism is further configured to send the packet to a server node in the cluster of nodes that provides a non-scalable service if no identifier for a scalable service is returned for the packet; and a return communication mechanism configured to send return communications directly to the client without forwarding the return communications through the interface node.

18. The apparatus of claim 17, wherein the server node identification mechanism is configured to map the source address to an entry in a packet distribution table, the packet distribution table including entries containing identifiers for server nodes in the cluster of nodes; and wherein mapping the source address includes using a hash function that maps different source addresses to different entries in the packet distribution table in a substantially random manner, and wherein the hash function always maps a given source address to the same entry in the packet distribution table.

19. The apparatus of claim 17, wherein the first lookup structure is a hash table containing the identifiers for the scalable services.

20. The apparatus of claim 17, further comprising a second lookup mechanism, wherein if the first lookup mechanism does not return an identifier for a scalable service, the second lookup mechanism is configured to use the destination address to perform a second lookup into a second lookup structure containing identifiers for scalable services.

21. The apparatus of claim 20, further comprising:

a checkpointing mechanism that is configured to periodically send checkpointing information from a primary packet distribution table (PDT) server to a secondary PDT server so that the secondary PDT server is kept in a consistent state with the primary PDT server; and a failover mechanism that is configured to allow the secondary PDT server to take over for the primary PDT server if the primary PDT server fails.

22. The apparatus of claim 21, wherein the checkpointing mechanism is additionally configured to periodically send checkpointing information from the primary PDT server to a slave PDT server located on the interface node.

* * * * *